US006001456A

United States Patent [19]

Newland

[11] Patent Number: 6,001,456

[45] Date of Patent: Dec. 14, 1999

[54] DOOR MAT HAVING DIFFERING MESSAGES WHEN VIEWED FROM INCOMING AND EXISTING SIDES

[76] Inventor: John Richard Newland, 939 Center Rd., Eastlake, Ohio 44095

[21] Appl. No.: 08/979,615

[22] Filed: Nov. 28, 1997

[51] Int. Cl.[6] .............................. B32B 3/28; G09F 13/00; A47G 9/06

[52] U.S. Cl. .......................... 428/167; 428/120; 428/187; 428/192; 428/212; 40/453; 5/417

[58] Field of Search ................................ 5/417; 428/120, 428/167, 187, 81, 192, 212, 542.2; 40/453; D6/582

[56] References Cited

U.S. PATENT DOCUMENTS

D. 105,428 4/1937 Bahr ........................................ D6/583

D. 350,253 9/1994 Livingstone et al. .................... D6/583

4,109,439 8/1978 Feasel ....................................... 52/667

4,255,380 3/1981 Bjorkland ................................. 40/453

*Primary Examiner*—Donald Loney

*Attorney, Agent, or Firm*—Vytas R. Matas

[57] ABSTRACT

A floor mat is provided which has a message assembly comprising a plurality of triangular shaped members with each member having one substantially inclined side and an opposite side formed at a substantially right angle. An exit message is formed on a series of adjacently located inclined sides of a series of elements making the message readable from about three feet from the mat to the mat itself when facing these inclined elements. An entrance message is formed on a plurality of adjacent right angle sides making the entrance message visible from about ten feet to within three feet of the mat when facing the right angle side of the mat. When either the entrance or exit message is being viewed, the other message is hidden from view.

18 Claims, 4 Drawing Sheets

| ARRIVING MESSAGES: | DEPARTING MESSAGES: |
|---|---|
| 1) WELCOME...................... | COME AGAIN |
| 2) WELCOME...................... | THANK YOU |
| 3) WELCOME...................... | PEACE BE WITH YOU |

DOOR MAT HAVING DIFFERING MESSAGES WHEN VIEWED FROM INCOMING AND EXISTING SIDES

BACKGROUND OF THE INVENTION

1. Field of the Invention

The present invention is generally drawn to door mats having message or pictures therein and more particularly to such mats which provide different messages or pictures when viewed from the entrance or exit side of the mat.

2. Description of the Prior Art

Floor mats are known which have pictures, logos or writing thereon. Examples of such mats are seen in U.S. Pat. No. DES. 200,152 and U.S. Pat. No. DES. 350,253. The messages include writings such as "welcome" and have surface textures varying from thick mat to slight corrugations. However, none of these mats provide one message when viewing the mat from its entrance side and a second message when viewing the mat from the exit side with the non-viewed message being hidden from view.

Door mats are also known which which have triangular, spiked and truncated triangular surfaces. Examples of such mats are seen in U.S. Pat. No. 385,044; U.S. Pat. No. DES. 187, 639; U.S. Pat. No. DES. 105,428; and U.S. Pat. No. DES. 310,460. None of these mats, however, have any teaching of how messages may be placed on such surfaces let alone how differing entrance and exit messages may be placed thereon which will allow only one message to be read while hiding the other message when viewing the mat from either the entrance or exit side.

Signs and carpets are also known which display different images or messages depending upon the angle of view of the sign or the mat angle of the carpet. Examples of such arc soon in U.S. Pat. No. 4,255,380 dealing with signs and U.S. Pat. No. 3,674,616 dealing with carpets. However, there is no teaching in either patent how a door mat may be designed to have different entrance and exit messages with variable distances of view which is needed in a welcome mat.

The sign patent has triangles of equal inclanation on which different messages are printed. Thus the differing messages would be visible from the same distances from the sides of the sign. This is unsuitable for a mat. The carpet dopends on the stroked inclanation of the carpet fibers to display different pictures. Again this is unsuitable for a mat.

Thus what was needed was a door mat having an entrance message viewable from a first distance away from the mat entrance side while hiding the mat's exit message and an exit message different from the entrance message which is viewable from a second shorter distance facing the exit side of the mat while hiding the entrance message.

BRIEF SUMMARY OF THE INVENTION

The present invention solves the problems associated with prior art door mats and others by providing a door mat having an entrance message viewable from a distance away from the mat entrance side while hiding the mat's exit message and an exit message different from the entrance message which is viewable from a short distance facing the exit side of the mat while hiding the entrance message.

To accomplish this, a rigid mat surface is formed leaving a plurality of substantially triangular surfaces adjacent to each other with one upright surface of each triangle being a different angle from the other upright surface. The triangle sides having a more inclined surface are used to form the entrance message while the sides having a less inclined surface are used to form the exit message.

The exit and entrance messages are formed by painting or taping parts of the message on a plurality of the same surfaces of the adjoining triangles so that only the total exit or entrance message is seen depending of the view being from either the entrance or exit side of the mat. Since the exit message is viewed only from a few feet away from the mat as the door is opened, this message is formed on the less inclined surfaces of the mat triangles. The entrance message is viewed from a distance as the viewer approaches the doorway and hence the entrance message is formed on the more inclined, almost vertical, surfaces of the adjoining triangles. The height and the angles of the triangles cause only the entrance or exit messages to be seen depending on the mat side being viewed. While the angle of the triangles must remain the same, the height length of the triangles may be enlarged or shrunk without the mat loosing its functionality. The particular height chosen was a subjective decision based on personal preference for the size of the desired message.

In view of the foregoing it will be seen that one aspect of the present invention is to provide a door mat having an entrance and an exit message which is visible only from the entrance and exit side of the mat respectively.

Another aspect of the present invention is to provide a door mat having an entrance message visible from a distance away from the entrance side of the mat.

Yet another aspect of the present invention is to provide a door mat having an exit message visible from a distance proximate to the exit side of the mat.

These and other aspects of the present invention will be more fully understood upon a review of the following description of the preferred embodiment when considered along with the accompanying drawings.

DESCRIPTION OF THE PREFERRED EMBODIMENT

Figure 1:
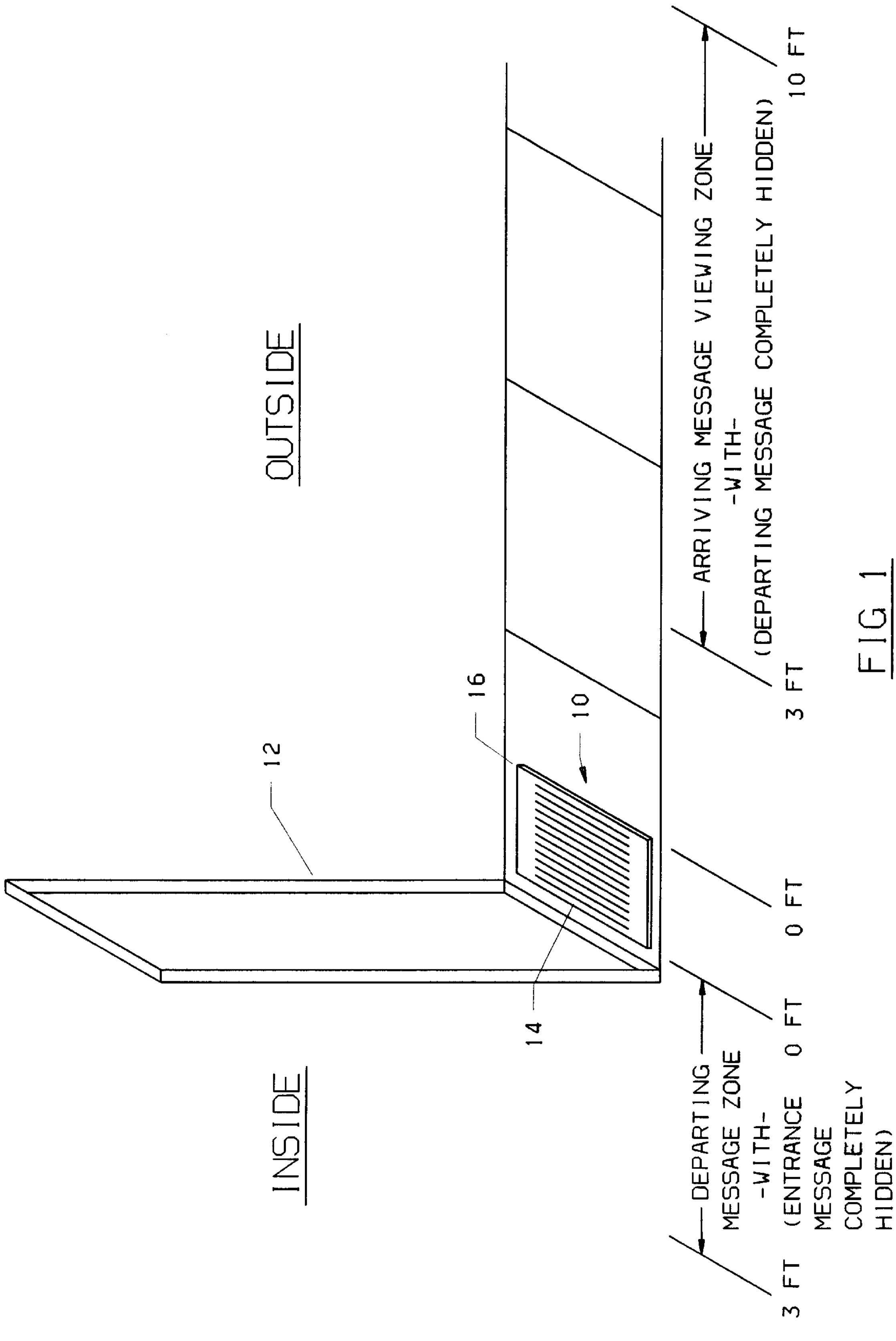
FIG. 1 is a perspective view of the door mat placed in a doorway to provide entrance and exit messages.

Referring now to the drawings where the showings are to illustrate a preferred embodiment of the invention without limiting same to these showings, FIG. 1 shows a mat assembly (10) properly placed next to and outside of a doorway (12). The exit side (14) of the mat assembly (10) is facing and next to the inside of the doorway (12) with an entrance side (16) of the mat assembly (10) being away from the doorway(12).

Figure 2:
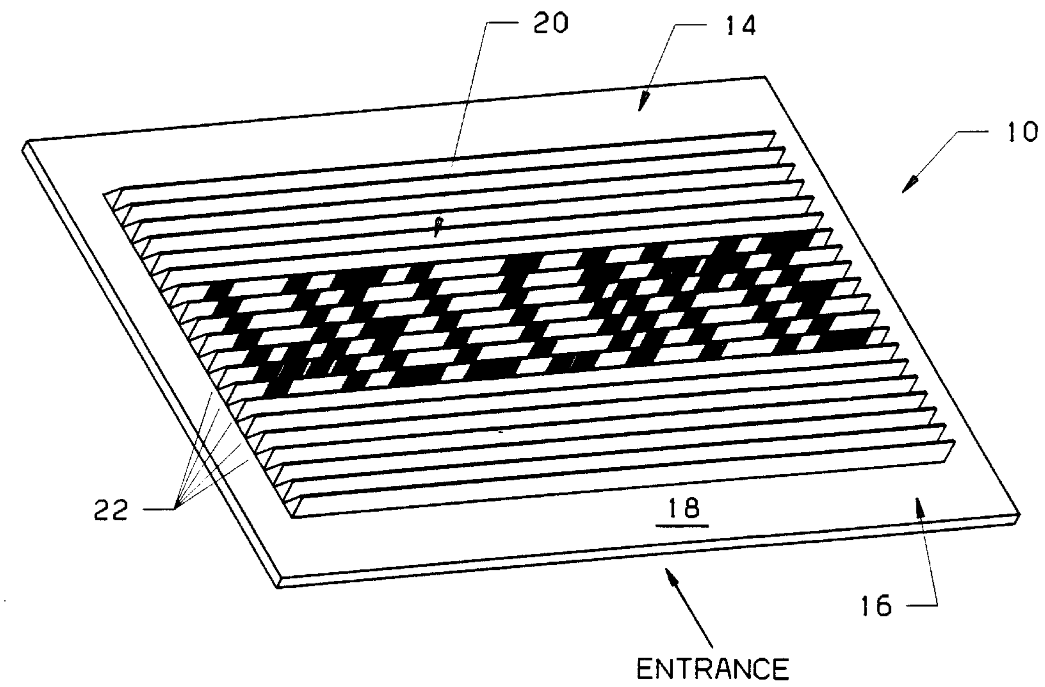
FIG. 2 is an expanded view of the door mat of FIG. 1 viewed from the entrance side of the doorway.

Experiments with the mat assembly (10) of the present invention using an adult person of average height have shown that an entrance message (WELCOME) formed on the mat assembly (10) and shown in FIG. 2 is easily seen by, such a person approaching the mat assembly (10) from a distance of approximately ten feet away from the mat assembly (10). The exit message (COME AGAIN) is seen in FIG. 3 and is blocked from the view of the person approaching the entrance side (16) of the mat assembly (10) within this mentioned distance.

A person exiting the doorway (12) will see the mat assembly (10) only when he is a few feet away or almost on top thereof. Thus the mat assembly (10) has the exit message formed on the exit side (14) so that this message is seen from a distance of three feet away from the exit side (14) of the mat assembly (10) to a zero distance right in front or almost on top of the assembly (10). The entrance message is effectively blocked within this distance.

Figure 3:
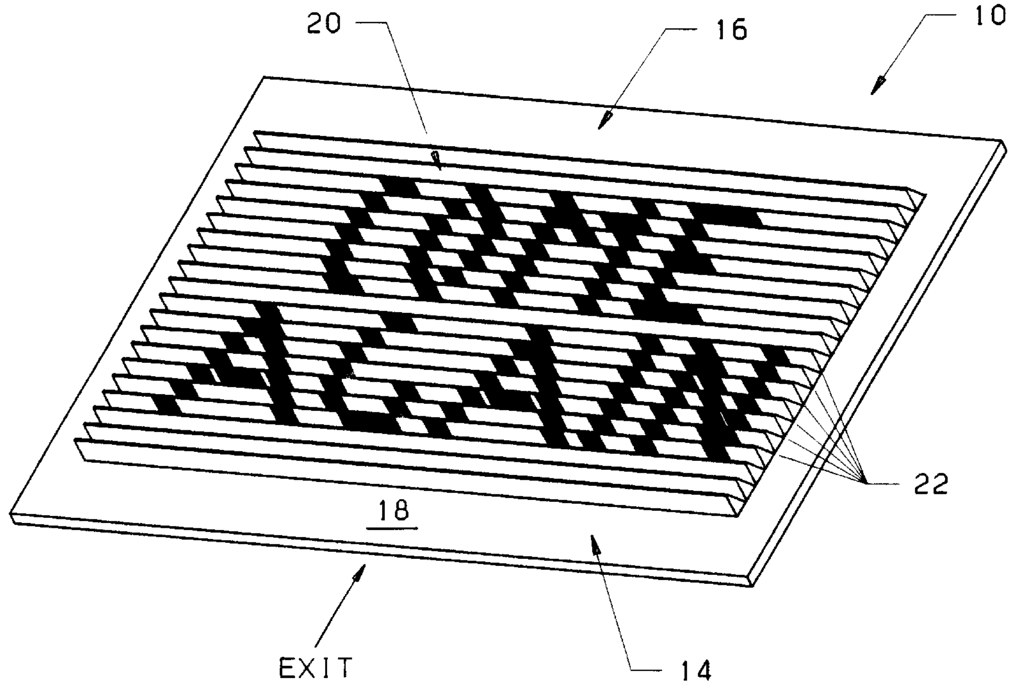
FIG. 3 is an expanded view of the door mat of FIG. 1 viewed from the exit side of the doorway.
Figures 4, 5:
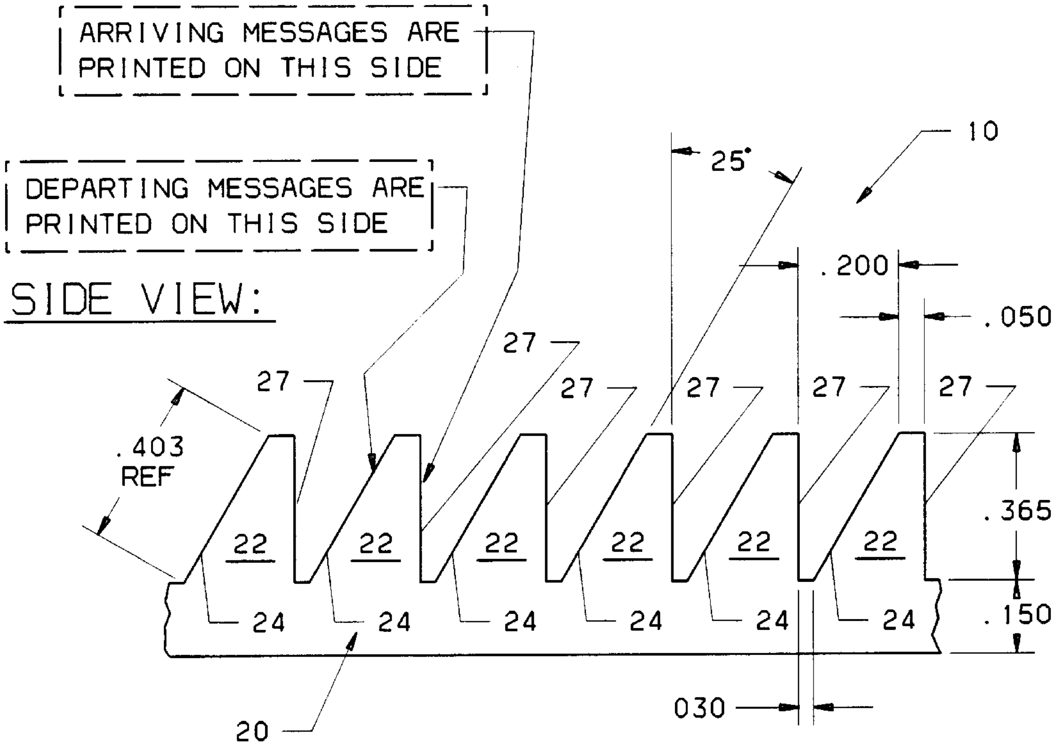
FIG. 4 is a partial cross-sectional view of the door mat of FIG. 2 taken along section A—A.
FIG. 5 is a chart showing typical entrance messages with complimentary exit messages.

Referring now to FIGS. 2–4 it is seen that the mat assembly (10) is formed from a rubber or similar material to have a peripheral border or frame surrounding a message assembly (20) comprising a plurality of substantially triangular or sawtooth members (22). The border (16) is substantially flat and may have a separate message thereon if one is desired. The height width, spacing, truncation and offset of the message assembly members (22) is given in inches on the FIG. 4 depiction. It will be seen that each member (22) has one substantially inclined surface (24) and an opposite substantially more inclined or vertical surface (27). The substantially inclined surfaces (24) are inclined at a 65 degree angle and are used to display the exit message. The incline allows the viewing of the exit message within the short distances noted with reference to FIG. 1. The more inclined or vertical surfaces (27) are formed at a 90 degree or right angle and allow the viewing of the entrance message within the distances mentioned with reference to FIG. 1.

The messages are formed by painting or taping individual parts of the message on adjoining surfaces (24) or (27) depending on the message being an entrance or exit message. As best seen in FIG. 2 when viewing the mat assembly as a whole, the entire message is displayed within the appropriate distances. The messages could be a pictorial representation rather than mere writing or could include a combination of both such as a particularly bold distinctive font for the message.

Referring to FIG. 5 it will be understood that while one specific entrance and exit message is shown in FIG. 2 and 3, other appropriate messages could also be formed as described in the table therein. Also, various pictures or logos could be similarly displayed by breaking them up into individual strips which would be glued on the appropriate surfaces (24) or (27).

Figure 6:
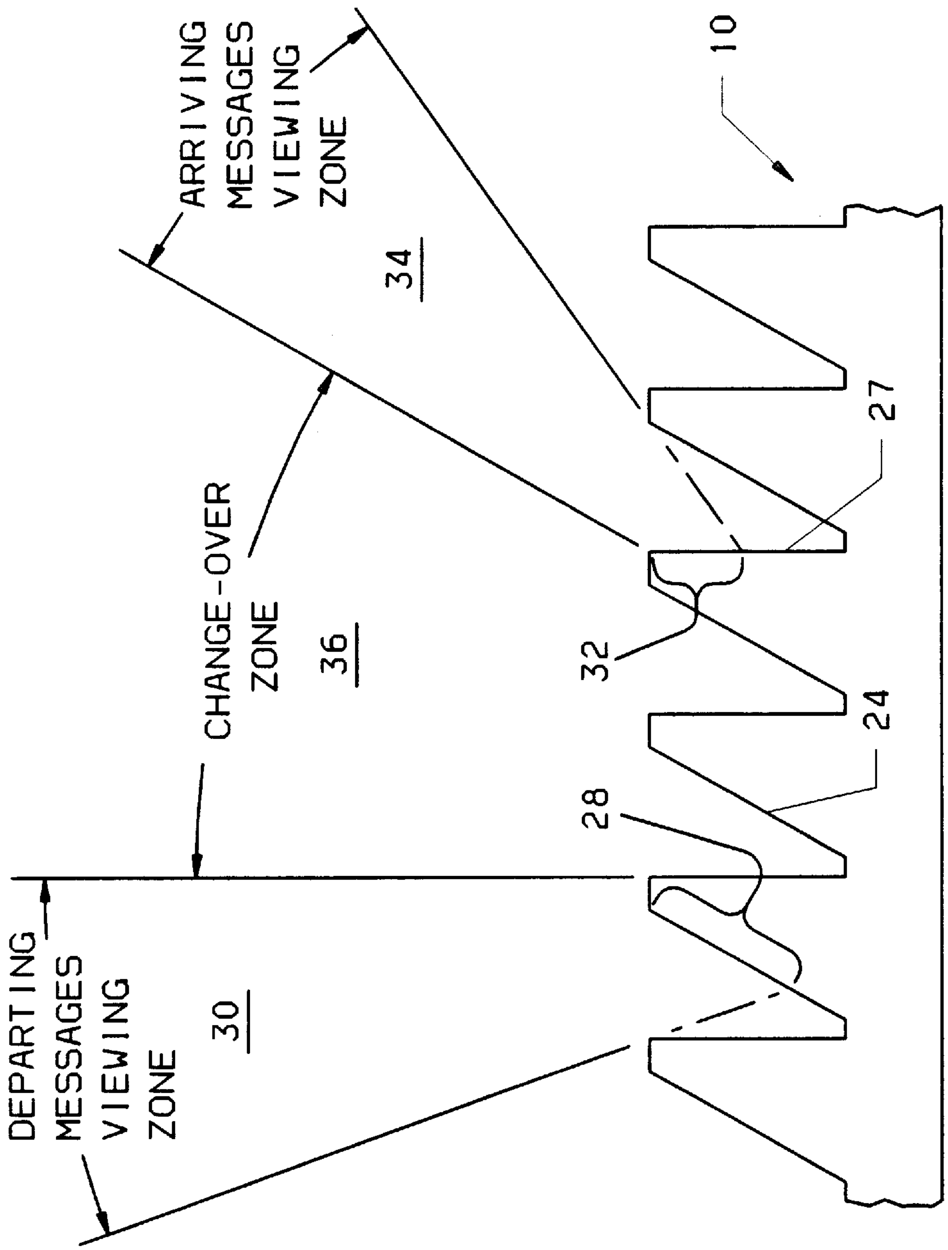
FIG. 6 is a continuation of FIG. 4 showing the viewing zones of the mat as seen by an average height person.

Turning next to FIG. 6 it will be seen how the viewing for the exit or departing message strips must be placed on the surfaces (24) within at least the section (28) which is within the viewing zone (30). The message may be extended to cover the entire triangle sides (24) and (27). Similarly the entrance or arrival message strips must be placed on the surfaces (27) within at least the section (32) which is within the viewing zone (34). Zone (36) lies between viewing zones (30) and (34) and comprises an area where the viewer stepping on the mat assembly (10) could see either the entrance or exit message or both. However, people generally do not look down on the mat when they are already stepping on it and any confusion is unlikely.

Certain modifications and additions will be obvious to one of ordinary skill in this art area. All such have been deleted herein for the sake of conciseness and readability but are properly included in the scope of the following claims.

What is claimed is:

1. A substantially rectangular door mat having a first entrance message visible from a first far distance and second exit message visible from a second distance closer than said first distance formed on the sides thereof with only said first or second messages being visible depending on the side of the mat being viewed comprising:

a series of substantially triangular members formed parallel to the sides of the mat;

one side of each of said triangular members being inclined at a first angle;

sides of each of said triangular members opposite said one side being inclined at a second angle greater than said first angle;

said first entrance message being formed on said one side of said triangular members to be visible from a further distance from the mat; and said second exit message being formed on said opposite sides of said triangular members to be visible from a second exit distance closer than said first entrance distance.

2. A substantially rectangular mat as set forth in claim 1 wherein said mat is a door mat for placement in an exterior door entrance with said opposite sides of said triangular members inclined at said exit angle being adjacent the door entrance.

3. A substantially rectangular mat as set forth in claim 2 wherein said second message is one appropriate for exiting a doorway.

4. A substantially rectangular mat as set forth in claim 3 wherein said second message reads COME AGAIN.

5. A substantially rectangular mat as set forth in claim 3 wherein said second message reads THANK YOU.

6. A substantially rectangular mat as set forth in claim 3 wherein said second message reads PEACE BE WITH YOU.

7. A substantially rectangular mat as set forth in claim 2 wherein said first message is one appropriate for entering a doorway.

8. A substantially rectangular mat as set forth in claim 7 wherein said first message reads WELCOME.

9. A substantially rectangular mat as set forth in claim 2 wherein said first and second messages include a pictorial representation of distinct first and second messages.

10. A substantially rectangular mat as set forth in claim 8 wherein the mat includes a rectangular border which is substantially flat.

11. A substantially rectangular mat as set forth in claim 8 wherein said rectangular border includes a written message thereon.

12. A substantially rectangular mat as set forth in claim 1 wherein said second angle is substantially 65 degrees.

13. A substantially rectangular mat as set forth in claim 12 wherein said first angle is substantially vertical.

14. A floor mat having a first and second message formed on the opposite sides thereof with only said first or second messages being visible depending on the side of the mat being viewed comprising:

a series of substantially triangular members formed parallel to the sides of the mat;

one side of each of said triangular members being inclined at a substantially vertical first angle;

sides of each of said triangular members opposite said one side being inclined at a second angle smaller than said first angle;

said first message being formed on said one side of said triangular members; and said second message being formed on said opposite sides of said triangular members.

15. A floor mat as set forth in claim 14 wherein said first angle is substantially 90 degrees and said second angle is substantially 65 degrees.

16. A floor mat as set forth in claim 15 wherein each of said triangular members is substantially 0.365 inches heigh, 0.030 inches at the base between each triangle and has a truncated tip approximately 0.050 inches across.

17. A floor mat as set forth in claim 16 wherein said triangular members are formed on a rubber mat substantially 0.150 inches thick.

18. A floor mat as set forth in claim 17 wherein said mat has a substantially flat border around the perimeter thereof.

* * * * *